(12) United States Patent
Inagaki

(10) Patent No.: US 7,901,828 B2
(45) Date of Patent: Mar. 8, 2011

(54) FUEL CELL

(75) Inventor: Toshiyuki Inagaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 305 days.

(21) Appl. No.: 12/304,816

(22) PCT Filed: Jun. 18, 2007

(86) PCT No.: PCT/JP2007/062647
§ 371 (c)(1),
(2), (4) Date: Dec. 15, 2008

(87) PCT Pub. No.: WO2007/148810
PCT Pub. Date: Dec. 27, 2007

(65) Prior Publication Data
US 2009/0176145 A1 Jul. 9, 2009

(30) Foreign Application Priority Data

Jun. 20, 2006 (JP) .................................. 2006-170514

(51) Int. Cl.
*H01M 8/24* (2006.01)
(52) U.S. Cl. ........................................ 429/469; 429/467
(58) Field of Classification Search ........................ None
See application file for complete search history.

(56) References Cited

U.S. PATENT DOCUMENTS

| 6,057,053 | A  | * | 5/2000 | Gibb | ........................... | 429/465 |
| 6,361,894 | B1 | * | 3/2002 | Bronold et al. | ............... | 429/434 |
| 7,833,678 | B2 | * | 11/2010 | Inagaki | ........................ | 429/511 |

FOREIGN PATENT DOCUMENTS

| JP | 7-275542 A | 10/1995 |
| JP | 7-301210 A | 11/1995 |
| JP | 2001-332280 A | 11/2001 |
| JP | 2003-060161 A | 2/2003 |
| JP | 2004-127809 A | 4/2004 |
| JP | 2004-288618 A | 10/2004 |
| JP | 2005-142049 A | 6/2005 |
| JP | 2005-317359 A | 11/2005 |
| JP | 2006-114362 A | 4/2006 |
| JP | 2006-120346 A | 5/2006 |
| JP | 2006-244750 A | 9/2006 |

* cited by examiner

*Primary Examiner* — John S Maples
(74) *Attorney, Agent, or Firm* — Kenyon & Kenyon LLP

(57) ABSTRACT

A fuel cell is provided with a cell laminated body in which a plurality of cells are laminated, an end plate arranged outside the cell laminated body in a laminating direction; and a spring module which is arranged between the cell laminated body and the end plate so as to adjust a compressive load to the cell laminated body. The spring module is provided with coil springs which are arranged between an upper plate and a lower plate so as to separate the upper plate and the lower plate from each other by an elastic force. The spring module is provided with a plurality of load display sections having display shafts which are fixed to the lower plate, inserted into through holes of the upper plate and protrude from the outer surface of the upper plate on an end plate side.

5 Claims, 4 Drawing Sheets

FUEL CELL

This is a 371 national phase application of PCT/JP2007/062647 filed 18 Jun. 2007, which claims priority to Japanese Patent Application No. 2006-170514 filed 20 Jun. 2006, the contents of which are incorporated herein by reference.

TECHNICAL FIELD

The present invention relates to a fuel cell having a cell laminated body in which power generation cells are laminated.

BACKGROUND ART

In recent years, a fuel cell car or the like has received attention in which a fuel cell for generating a power by an electrochemical reaction between a fuel gas and an oxidizing gas is used as an energy source.

Such a fuel cell is usually constituted as a fuel cell stack including a cell laminated body in which the required number of cells for generating the power by the electrochemical reaction between the fuel gas and the oxidizing gas are laminated, and an end plate which is arranged outside this cell laminated body in a laminating direction and which imparts a compressive load adjusted with a load adjustment screw to the cell laminated body.

Moreover, in this fuel cell, to uniform the compressive load to the cell laminated body and decrease the fluctuation of the compressive load, a spring module in which a plurality of springs are arranged between plates is interposed between the cell laminated body and the end plate (e.g., see Japanese Patent Application Laid-Open No. 2004-288618).

This spring module is provided with graduations on a side wall vertically disposed on the peripheral edge of one of the plates, and the end position of a side wall vertically disposed on the peripheral edge of the other plate can be read from the graduations to grasp the compressive load to be imparted to the cell laminated body via the spring module.

DISCLOSURE OF THE INVENTION

However, in the above spring module, a compressive load is read on the side of one side surface provided with graduations, the one side surface provided with the graduations is covered, depending on the arranged state of a fuel cell or the received state of the fuel cell in a case, and it is therefore difficult to read the compressive load.

The present invention has been developed in view of the above situation, and an object thereof is to provide a fuel cell in which a compressive load to be imparted to a cell laminated body can smoothly be read.

To achieve the object, according to the present invention, there is provided a fuel cell comprising: a cell laminated body in which a plurality of cells are laminated; an end plate arranged outside the cell laminated body in a laminating direction; and a pressing device which is provided between the cell laminated body and the end plate so as to adjust a compressive load to the cell laminated body, the pressing device including a pair of plate members, an elastic member provided between these plate members so as to separate the plate members from each other by an elastic force, and a load display section having a display member which is fixed to one of the plate members and which protrudes from the outer surface of the other plate member.

According to such a constitution, even when the side surface of the pressing device is covered, the protruding amount of the display member from the outer surface of the other plate member can visually be checked to smoothly grasp the compressive load exerted to the cell laminated body.

Moreover, in the pressing device, a storage space of the elastic member may be closed with side walls which are formed on the peripheral edges of the plate members so as to overlap with each other.

According to such a constitution, even when the storage space of the elastic member is closed, the protruding amount of the display member from the outer surface of the other plate member can visually be checked from the outside to easily grasp the compressive load.

Furthermore, the pressing device may be provided with the load display sections in a plurality of in-plane positions.

According to such a constitution, the protruding amounts of the display members of the load display sections provided in the plurality of positions can be measured to smoothly grasp the compressive load exerted to the cell laminated body, and the tilts of the plate members can be grasped, so that the balance of the compressive load can be grasped.

Moreover, according to the present invention, there is provided a fuel cell comprising: a cell laminated body in which a plurality of cells are laminated; an end plate arranged outside the cell laminated body in a laminating direction; and a pressing device which is provided between the cell laminated body and the end plate so as to adjust a compressive load to the cell laminated body, the pressing device including a pair of plate members, an elastic member arranged between these plate members so as to separate the plate members from each other by an elastic force, and a plurality of load display sections indicating a space between the plate members, the respective load display sections being visually checkable from a predetermined direction.

According to such a constitution, all the load display sections can visually be checked from the predetermined direction to grasp the balance of the compressive load. Moreover, the respective load display sections can be adjusted while visually checking the sections from the predetermined direction, so that the assembling operability of the pressing device can be improved.

According to the fuel cell of the present invention, the compressive load to be imparted to the cell laminated body can smoothly be read.

BEST MODE FOR CARRYING OUT THE INVENTION

Next, a first embodiment of a fuel cell according to the present invention will be described with reference to FIGS. 1 to 3.

Figure 1:
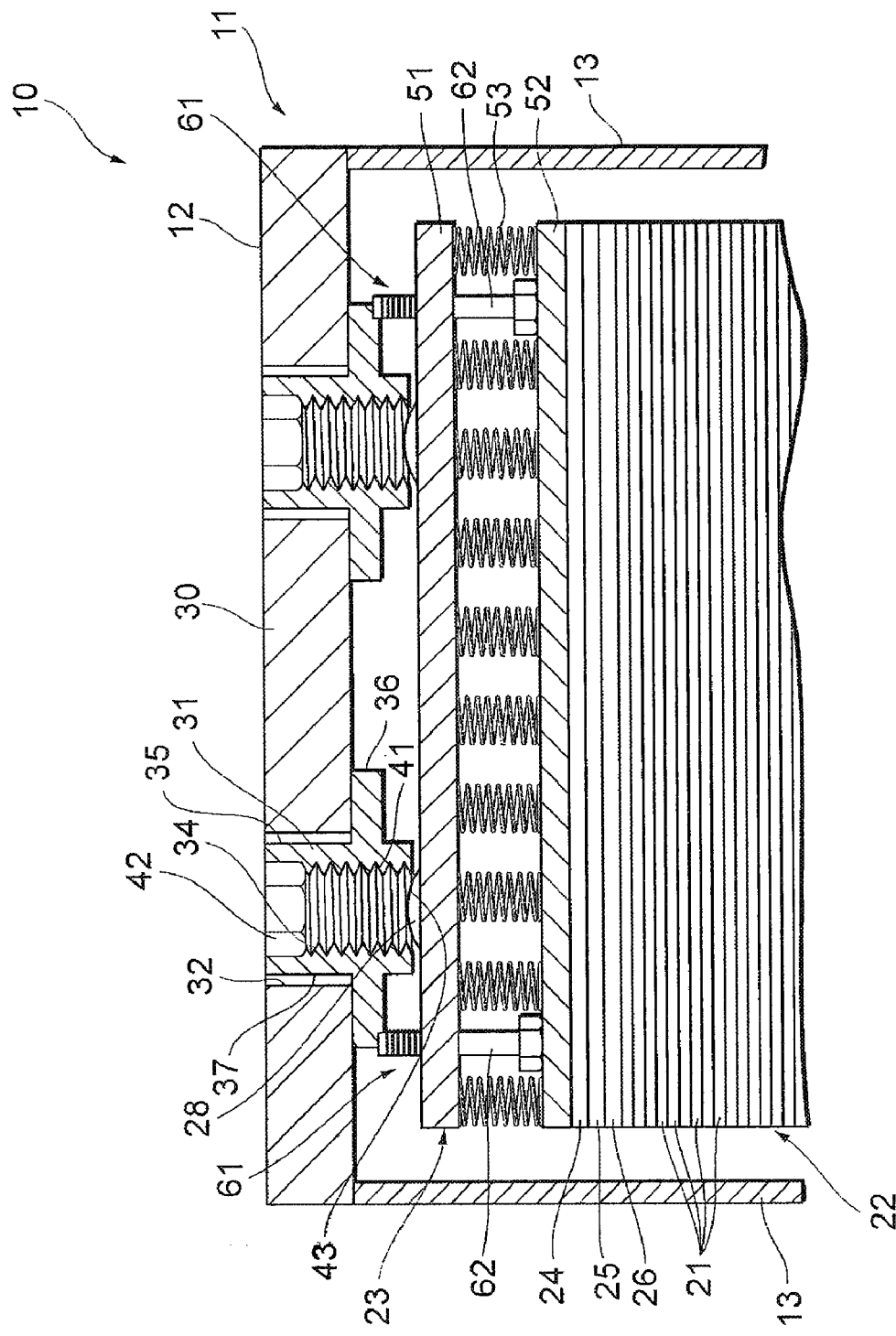
FIG. 1 is a sectional view of a part of a fuel cell according to the present embodiment.

FIG. 1 shows a fuel cell 10. This fuel cell 10 is applicable to a car-mounted power generation system of a fuel cell car, a power generation system for any mobile body such as a ship, an airplane, a train or a walking robot, a stational power generation system for use as a power generation facility for a construction (a housing, a building or the like) or the like, but the fuel cell is specifically used for a car.

The fuel cell 10 has a fuel cell stack 11, and a stack case (not shown) constituted of an insulating material such as a synthetic resin which covers this fuel cell stack 11. In the fuel cell stack 11, the outer edges of a pair of rectangular end plates 12 (one of them is omitted from the drawing) are connected to each other via tension plates 13 to constitute an outer part, and the end plates 12 and the tension plates 13 are made of, for example, duralumin or the like.

Moreover, the fuel cell stack 11 is provided with a cell laminated body 22 in which the required number of cells 21 having a rectangular shape in planar view and receiving the supply of a fuel gas and an oxidizing gas to generate a power are laminated between the end plates 12. Moreover, between one end plate 12 and the cell laminated body 22, a spring module (a pressing device) 23, an insulating plate 24, a terminal plate 25 and a cover plate 26 are arranged in order from an end plate 12 side. It is to be noted that the cover plate 26 may be omitted.

It is to be noted that although not shown, between the other end plate 12 and the cell laminated body 22, the insulating plate 24, the terminal plate 25 and the cover plate 26 are arranged in order from the end plate 12 side.

Moreover, the end plate 12 on the side provided with the spring module 23 is constituted of a rectangular end plate main body 30 connected to the tension plates 13, and stoppers 31 provided in an inner range from the connecting positions of this end plate main body 30 to the tension plates 13.

The end plate main body 30 is provided with a plurality of through holes 32 which extend through the main body in a thickness direction. The stoppers 31 abut on the end plate main body 30 on the spring module 23 side to reinforce the end plate 12 including the end plate main body 30. Each stopper 31 has a cylindrical boss portion 35 in which an internal thread 34 is formed, and a substantially disc-like flange portion 36 radially externally extending from the center of this boss portion 35 in an axial direction to the whole periphery of the boss portion, having the same axis as that of the boss portion 35 and having a predetermined thickness.

Moreover, one cylindrical portion 37 of the stopper 31 protruding from a flange portion 36 of the boss portion 35 to one side of the boss portion in the axial direction is inserted into the through hole 32 of the end plate main body 30, and the whole surface of the flange portion 36 is allowed to abut on the end plate main body 30. It is to be noted that the axial length of the one cylindrical portion 37 of the stopper 31 is equal to that of the through hole 32 of the end plate main body 30, and the end face of the cylindrical portion 37 has the same plane as that of the outer end face of the end plate main body 30.

Furthermore, the end plate 12 has load adjustment screws 41 to be engaged with the internal threads 34 of the stoppers 31, and the load adjustment screws 41 abut on spherical protrusions 28 of the spring module 23 formed on the end plate 12 side. Here, each load adjustment screw 41 is provided with a concave portion 43 on a protrusion 28 side, and this concave portion 43 engages with the protrusion 28.

Moreover, the load adjustment screw 41 is provided with a tool fitting portion 42 into which a tool such as a hexagonal bolt is fitted, on a side opposite to the protrusion 28. The load adjustment screw 41 is rotated via the tool fitted into this tool fitting portion 42 to adjust a distance between the end plate 12 and the end of the cell laminated body 22, thereby adjusting a compressive load to be exerted to the cell laminated body 22.

Figure 2:
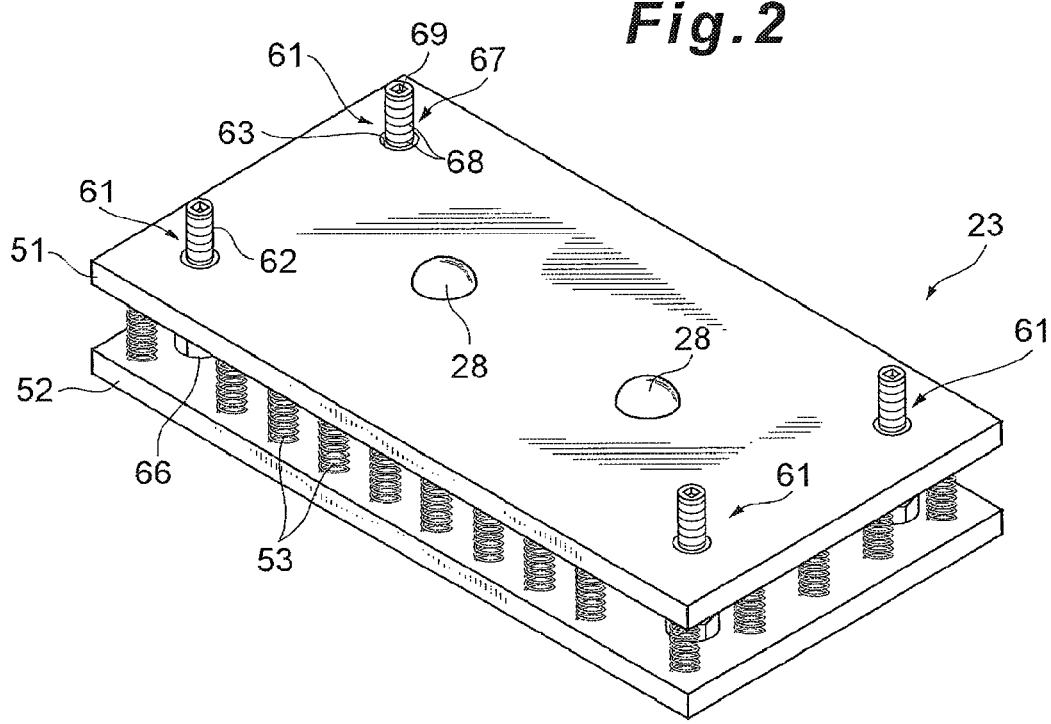
FIG. 2 is a perspective view explaining a structure of a spring module provided in the fuel cell.

As also shown in FIG. 2, the spring module 23 has an upper plate (a plate member) 51 on the end plate 12 side and a lower plate (a plate member) 52 on the cell laminated body 22 side. A plurality of coil springs (elastic members) 53 are arranged between the upper plate 51 and the lower plate 52. The upper plate 51 and the lower plate 52 are formed of a metal material such as aluminum having a small specific weight, and the upper plate 51 is provided with the protrusions 28 which abut on the load adjustment screws 41.

Moreover, the spring module 23 includes load display sections 61 in positions near corners. These load display sections 61 have columnar display shafts (display members) 62 vertically disposed on the lower plate 52, and the display shafts 62 are inserted into through holes 63 formed in the upper plate 51 to protrude from the outer surface of the upper plate 51 on the end plate 12 side.

Figure 3:
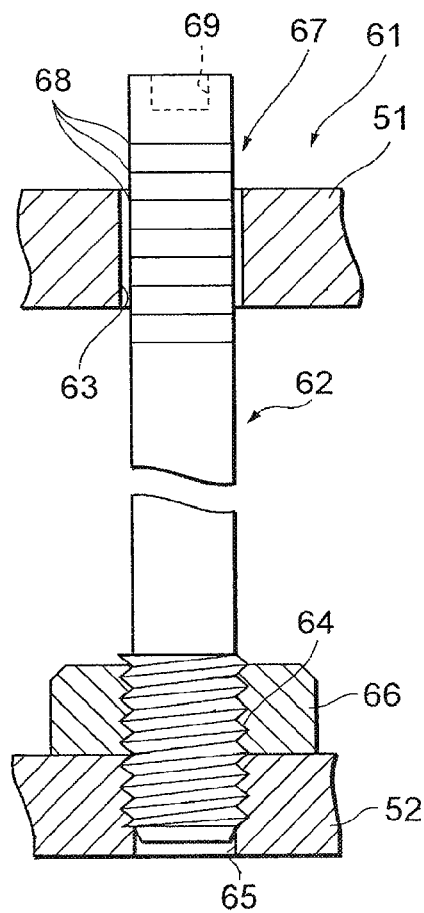
FIG. 3 is a sectional view explaining a structure of a load display section provided in the spring module.

As shown in FIG. 3, the display shaft 62 is provided with a screw portion 64 on the side of one end of the shaft, and this screw portion 64 is screwed into a screw hole 65 formed in the lower plate 52 to attach this screw portion to the lower plate 52.

A tool fitting portion 69 constituted of a hexagonal hole into which a tool such as a hexagonal bolt is fitted is formed in the other end of this display shaft 62, and the display shaft 62 can be rotated via the tool fitted into this tool fitting portion 69 to adjust the amount of the shaft to be screwed into the screw hole 65 of the lower plate 52.

It is to be noted that the tool fitting portion 69 is not limited to the hexagonal hole, and may be formed as a head having a hexagonal shape in planar view so that the shaft can be rotated by a hexagonal wrench, or a plurality of radially formed peripheral convex portions so that the shaft can be rotated by a so-called torque wrench. Furthermore, a cross hole or a linear groove may simply be formed in the end face of the shaft so that the shaft can be rotated by a driver.

Moreover, the screw portion 64 of the display shaft 62 is engaged with a lock nut 66, and the lock nut 66 is rotated and pressed onto the lower plate 52 in a state in which the display shaft 62 is screwed into the lower plate 52, to fix the display shaft 62 to the lower plate 52.

Furthermore, the display shaft 62 constituting this load display section 61 has a graduation part 67 in the other end of the shaft on a side opposite to the screw portion 64. This graduation part 67 is constituted of a plurality of graduation lines 68 formed by, for example, imprinting or the like, with a predetermined space being left between the graduation lines in the axial direction. These graduation lines 68 are formed over the whole periphery of the display shaft 62 along a peripheral direction.

In consequence, in this load display section 61, the protruding amount of the display shaft 62 protruding from the through hole 63 of the upper plate 51 is read in accordance with the graduation line 68 of the graduation part 67, so that the compressive load to be imparted to the cell laminated body 22 via the spring module 23 can be grasped.

Moreover, in the fuel cell 10, the compressive load imparted to the cell laminated body 22 by the load adjustment screw 41 is uniformed in a planar direction by the spring module 23 having a plurality of coil springs 53, and the fluctuation of the compressive load due to expansion/contraction during power generation is absorbed.

Here, according to the fuel cell 10 of the present embodiment, even in a case where the fuel cell stack 11 is received in the case or installed in a vehicle to cover the side surface of the spring module 23, when the protruding amount of the display shaft 62 from the outer surface of the upper plate 51 is visually checked, the compressive load exerted to the cell laminated body 22 can smoothly and precisely be grasped without using any load cell. Therefore, a need for an expensive device such as the load cell can be obviated, which realizes cost reduction.

Figure 4:
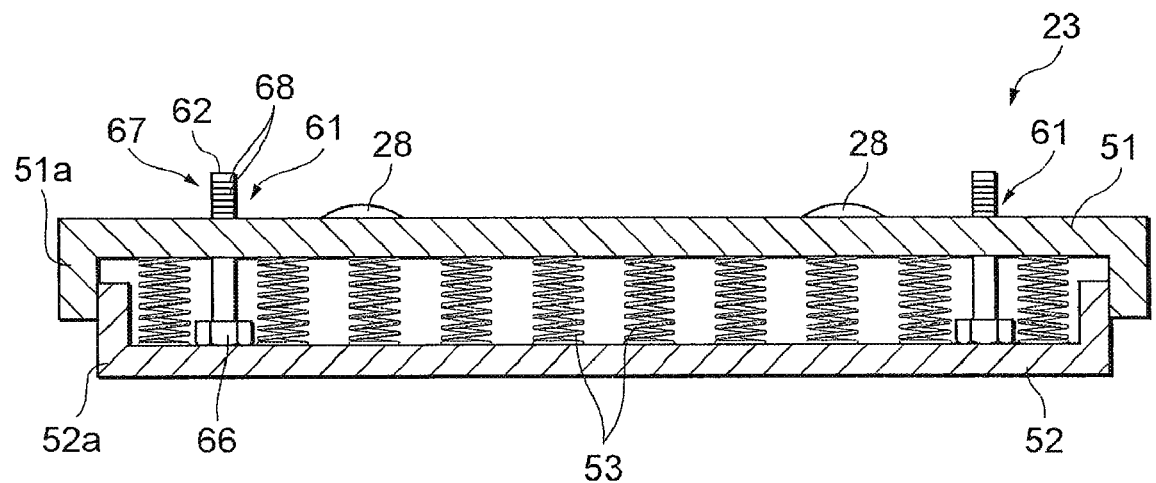
FIG. 4 is a sectional view showing a modification of the spring module.

Consequently, in particular, as shown in FIG. 4, even in a structure where side walls 51a, 52a which overlap with each other are formed at the peripheral edges of the upper plate 51 and the lower plate 52 to close a storage space for receiving the coil springs 53, when the protruding amount of each display shaft 62 is visually checked, the compressive load can remarkably easily be grasped.

Furthermore, since the load display sections 61 are provided in a plurality of in-plane positions of the spring module 23, the protruding amounts of the display shafts 62 of these load display sections 61 can be measured to smoothly grasp the compressive load exerted to the cell laminated body 22. Moreover, the tilts of the upper plate 51 and the lower plate 52 can be grasped, and the balance of the compressive load can be grasped.

Moreover, according to the present embodiment, the display shafts 62 of all the load display sections 61 can visually be checked from a predetermined direction to grasp the balance of the compressive load. In consequence, the respective load display sections 61 can be adjusted while visually checking the display shafts 62 from the predetermined direction, the number of adjustment steps can be decreased, and the assembling operability of the spring module 23 can be improved.

Here, to provide a load measurement portion on the side surface of the spring module 23, considering that the module is received in the case or installed in the vehicle to cover the side surface, two load measurement portions near both ends of each side surface, that is, eight load measurement portions in total are preferably provided. However, in the present embodiment, since the display shafts 62 of all the load display sections 61 can visually be checked from the predetermined direction, the load display sections 61 can be provided in four positions near the corners to sufficiently grasp the compressive load. In consequence, the load measurement portions can be decreased, and manufacturing cost and operations concerning adjustment can be decreased.

In addition, when the display shaft 62 is rotated, the amount of the shaft to be screwed into the lower plate 52 can be adjusted to finely adjust the positions of the graduation lines 68. In consequence, even in a case where design tolerance or the deflection of the upper plate 51 or the lower plate 52 lowers the precision of the position of the graduation line 68 determined owing to the elastic force of the coil springs 53 or the like, when the display shaft 62 is rotated to finely adjust the position of the graduation line 68, the position can easily be corrected to improve the precision.

Moreover, since the display shafts 62 fixed to the lower plate 52 are inserted into the through holes 63 of the upper plate 51 in the structure, the relative positional deviation of the upper plate 51 and the lower plate 52 in the planar direction can be suppressed, and the elastic force can smoothly be exerted by the coil springs 53.

Figure 5:
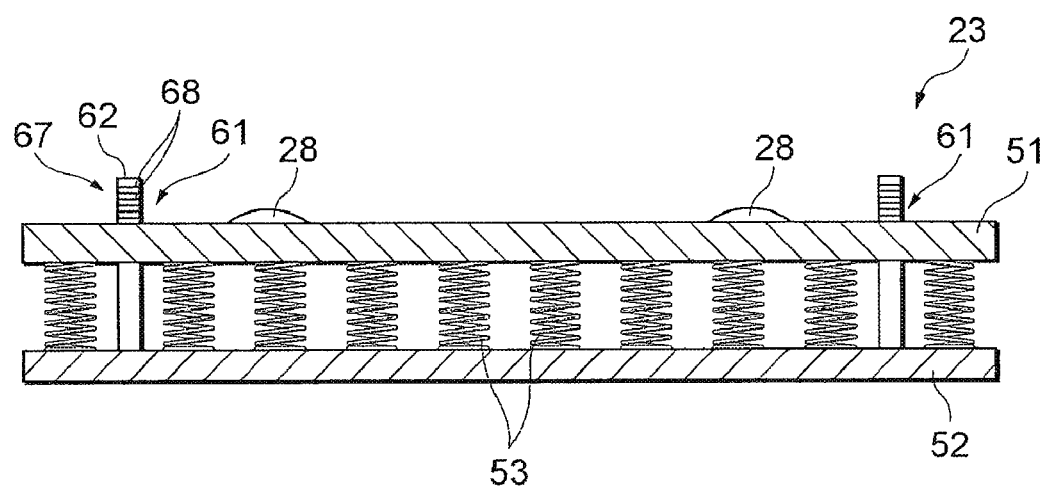
FIG. 5 is a side view of the spring module showing another fixing structure of a display shaft to a lower plate.

It is to be noted that in the above embodiment, the display shafts 62 are fixed to the lower plate 52 by the lock nuts 66 engaged with the screw portions 64 of the display shafts 62. However, when the screw portions 64 of the display shafts 62 have a sufficiently strong fastening force with respect to the screw holes 65 of the lower plate 52, as shown in FIG. 5, the screw portions 64 of the display shafts 62 may be screwed into the screw holes 65 of the lower plate 52, to fix the display shafts 62 to the lower plate 52 without providing any lock nut 66.

Figure 6:
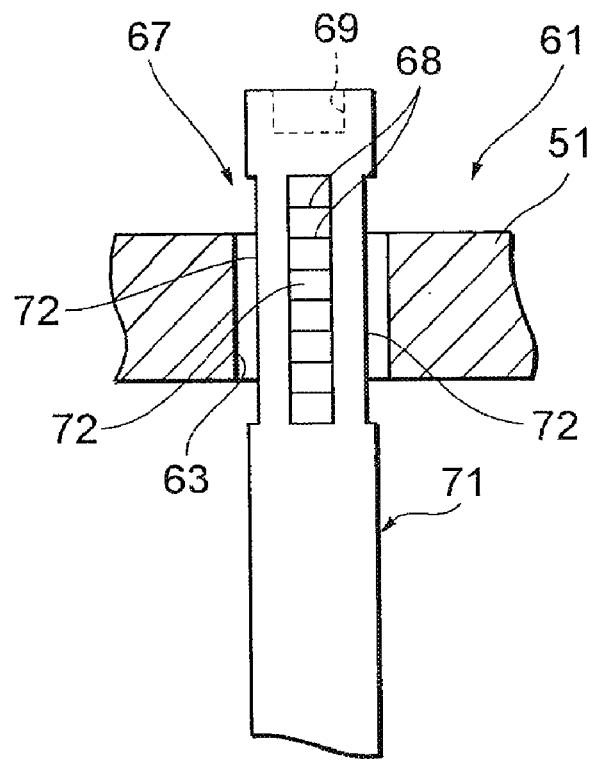
FIG. 6 is a side view showing a modification of the display shaft.
Figure 7:
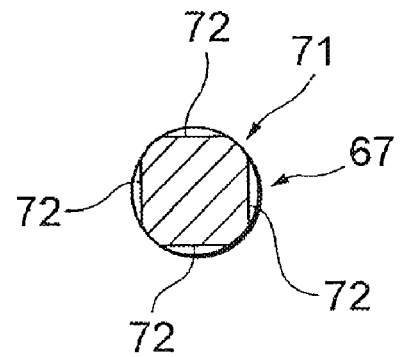
FIG. 7 is a sectional view showing a modification of the display shaft.

Moreover, FIGS. 6 and 7 show another example of the display shaft 62 constituting the load display section 61. As shown in FIGS. 6 and 7, planar portions are formed on the outer peripheral surface of a display shaft 71, whereby the shaft has four display faces 72 recessed from the outer peripheral surface. Moreover, the display faces 72 are provided with the graduation lines 68 to form the graduation part 67.

Furthermore, according to the graduation lines 68 of the display shaft 71, since the graduation lines 68 are formed on the display faces 72 recessed from the outer peripheral surface, the interference of the graduation lines 68 with the inner peripheral surface of the through hole 63 of the upper plate 51 can be eliminated. In consequence, wear due to the interference of the graduation lines 68 with the inner peripheral surface of the through hole 63 can be eliminated, and the life of the display shaft 71 can be lengthened.

The invention claimed is:

1. A fuel cell comprising: a cell laminated body in which a plurality of cells are laminated; an end plate arranged outside the cell laminated body in a laminating direction; and a pressing device which is provided between the cell laminated body and the end plate so as to adjust a compressive load to the cell laminated body, the pressing device including a pair of plate members, an elastic member provided between these plate members so as to separate the plate members from each other by an elastic force, and a load display section having a display member which is fixed to the plate member located on the side proximate the cell laminated body to protrude from the outer surface of the plate member located on the side proximate the end plate, a load adjustment screw being provided between the end plate and the pressing device, the display member being configured to protrude to a space between the end plate and the pressing device.

2. The fuel cell according to claim 1, wherein in the pressing device, a storage space of the elastic member is closed with side walls which are formed on the peripheral edges of the plate members so as to overlap with each other.

3. The fuel cell according to claim 1, wherein the pressing device is provided with the load display sections in a plurality of in-plane positions.

4. The fuel cell according to claim 1, wherein the load display section has a display member provided with a screw portion to be screwed into a screw hole of the plate member located on the side proximate the cell laminated body and graduation lines protruding from the outer surface of the plate member located on the side proximate the end plate, and the display member is rotated to adjust the amount of the screw portion into the screw hole and the positions of the graduation lines.

5. The fuel cell according to claim 1, wherein the load display section has a display member which is inserted into a through hole formed in the plate member located on the side proximate the end plate to protrude from the outer surface of the plate member, a portion of the display member is provided with a face recessed from the outer peripheral surface of the display member, and the recessed face is provided with graduation lines.

* * * * *